(12) United States Patent
Miyairi

(10) Patent No.: US 8,770,788 B2
(45) Date of Patent: Jul. 8, 2014

(54) BACKLIGHT UNIT, DISPLAY DEVICE, AND ELECTRONIC DEVICE

(75) Inventor: Hidekazu Miyairi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 322 days.

(21) Appl. No.: 13/276,813

(22) Filed: Oct. 19, 2011

(65) Prior Publication Data

US 2012/0099293 A1 Apr. 26, 2012

(30) Foreign Application Priority Data

Oct. 21, 2010 (JP) ................................. 2010-236187

(51) Int. Cl.
*F21V 33/00* (2006.01)

(52) U.S. Cl.
USPC ............... 362/231; 362/97.3; 362/311.02; 362/249.02

(58) Field of Classification Search
USPC ............. 362/231, 97.2, 97.1, 97.4, 311.02, 362/311.06, 249.02
See application file for complete search history.

(56) References Cited

U.S. PATENT DOCUMENTS

| 7,281,816 | B2 | 10/2007 | Suzuki |
| 7,936,411 | B2 | 5/2011 | Kim et al. |
| 2007/0159449 | A1 | 7/2007 | Yoo et al. |
| 2009/0091919 | A1* | 4/2009 | Goto ........................... 362/97.1 |
| 2009/0237916 | A1* | 9/2009 | Park ........................... 362/97.1 |
| 2010/0091519 | A1* | 4/2010 | Pijlman et al. ............... 362/609 |
| 2011/0249037 | A1 | 10/2011 | Koyama et al. |

FOREIGN PATENT DOCUMENTS

JP 2006-220685 8/2006

OTHER PUBLICATIONS

Koma, N. et al, "P-28: Color Field Sequential LCD Using an OCB-TFT-LCD," SID Digest '00: SID International Symposium Digest of Technical Papers, vol. 31, 2000, pp. 632-635.
Tai, W.-C. et al, "71.1: Invited Paper: Field Sequential Color LCD-TV Using Multi-Area Control Algorithm," SID Digest '08: SID International Symposium Digest of Technical Papers, vol. 39, 2008, pp. 1092-1095.

* cited by examiner

*Primary Examiner* — Laura Tso
(74) *Attorney, Agent, or Firm* — Husch Blackwell LLP

(57) ABSTRACT

A novel structure of a backlight unit where color-scan backlight drive is performed and a color mixture problem can be reduced is proposed. In the backlight unit where color-scan backlight drive is performed, in order not to form a color mixture region by light from a light source, an optical system is provided between the light source and a diffuser sheet so that the light is isotropically spread. Specifically, the distribution of intensity of light in the minor-axis direction is narrowed by the optical system provided between the light source and the diffuser sheet. The distribution of intensity of light in the major-axis direction is made uniform by the optical system. Further, the spread of light from the light source in the minor-axis direction in which a color mixture region is formed is suppressed and luminance on a light-emitting surface in the major-axis direction is made uniform.

22 Claims, 11 Drawing Sheets

A lenticular lens is not formed.    A lenticular lens is formed.

BACKLIGHT UNIT, DISPLAY DEVICE, AND ELECTRONIC DEVICE

BACKGROUND OF THE INVENTION

1. Field of the Invention

The present invention relates to backlight units. The present invention relates to display devices including the backlight units. The present invention relates to electronic devices provided with the display devices including the backlight units.

2. Description of the Related Art

Display devices typified by liquid crystal display devices are widely used in large display devices such as television receivers to small display devices such as cellular phones. High-value-added products will be needed and are being developed. In recent years, in view of rising interest in the global environment and improvement in convenience of mobile devices, development of low-power-consumption display devices has attracted attention.

As a low-power-consumption display device, there is a display device for displaying images by a field-sequential method (also referred to as a color-sequential display method, a time-division display method, or a successive additive color mixture display method). In the field-sequential method, lighting of backlights of red (hereinafter abbreviated to R in some cases), green (hereinafter abbreviated to G in some cases), and blue (hereinafter abbreviated to B in some cases) is switched with time, lights of R, G, and B are supplied to a display panel, and color images are viewed by additive color mixture. Thus, it is not necessary to provide a color filter in each pixel, the use efficiency of transmitting light from a backlight can be improved, and power consumption can be reduced. Since R, G, and B can be expressed in one pixel in a field-sequential display device, the field-sequential display device has an advantage that high-resolution images can be easily displayed.

Field-sequential drive has a unique display defect such as color breakup (also referred to as color break). It is known that the increase in frequency of write of video signals in a given period can reduce the problem of color breakup.

Patent Document 1 and Non-Patent Document 1 each disclose the structure of a field-sequential liquid crystal display device in which a display region is divided into a plurality of regions and a corresponding backlight unit is also divided into a plurality of regions in order to increase the frequency of write of video signals in a given period.

REFERENCE

Patent Document

Patent Document 1: Japanese Published Patent Application No. 2006-220685

Non-Patent Document

Non-Patent Document 1: Wen-Chih Tai et al., "Field Sequential Color LCD-TV Using Multi-Area Control Algorithm", *Proc. SID '08 Digest*, 2009, pp. 1092-1095.

SUMMARY OF THE INVENTION

In each of the structures disclosed in Patent Document 1 and Non-Patent Document 1, a display region is divided into a plurality of regions supplied with video signals of different colors and field-sequential drive is performed. A backlight unit corresponding to the plurality of regions of the display region is also divided into a plurality of regions, and the regions adjacent to each other in the backlight unit emit lights of different colors. At this time, lights of different colors that are emitted from the regions adjacent to each other in the backlight unit leak to the regions adjacent to each other in the display region, which results in a display defect.

Note that the display defect makes the lights of different colors in the backlight unit be viewed as mixed colors; thus, the display defect is hereinafter referred to as a color mixture problem. In addition, drive of a backlight unit at the time when field-sequential drive is performed while a display region is divided into a plurality of regions whose adjacent regions are supplied with video signals of different colors and a light source portion of the backlight unit corresponding to the plurality of regions of the display region is divided into a plurality of light source regions is referred to as color-scan backlight drive (or scan backlight drive). In the color-scan backlight drive, a light source emits lights of different colors in light source regions adjacent to each other in a plurality of light source regions.

The color mixture problem is described with reference to FIGS. 9A to 9C. FIG. 9A illustrates the structure of a backlight unit. FIG. 9A illustrates a light source portion 901, a light-emitting surface 902, and a diffuser sheet 903 as a backlight unit 900. Note that FIG. 9A schematically illustrates the light-emitting surface 902 divided into a plurality of regions at the time when light from the light source portion 901 light passes through the diffuser sheet 903 and is delivered to a display region, and the light-emitting surface 902 actually corresponds to a surface of the diffuser sheet 903.

Note that although not illustrated in FIG. 9A, an element substrate including a display element overlaps with the backlight unit 900. For example, in a liquid crystal display device, an element substrate has a region where transistors for controlling transmission and non-transmission of light from a backlight unit by a liquid crystal element that is a display element are arranged in matrix, and the region serves as a display region.

In the light source portion 901 illustrated in FIG. 9A, a plurality of light sources 911 that have color combinations for obtaining a white color by additive color mixture are arranged in matrix. In the light source portion 901, a plurality of light source regions corresponding to a plurality of regions of the display region are illustrated as a first light source region 912, a second light source region 913, and a third light source region 914. In addition, in the light source portion 901, a red (R) light-emitting diode 915, a green (G) light-emitting diode 916, and a blue (B) light-emitting diode 917 are illustrated as the light sources 911 that have the color combinations for obtaining a white color by additive color mixture.

In the light-emitting surface 902 illustrated in FIG. 9A, a first region 921, a second region 922, and a third region 923 are illustrated as regions corresponding to the first light source region 912, the second light source region 913, and the third light source region 914 in the light source portion 901. For example, when the red (R) light-emitting diode 915 emits light in the first light source region 912, the green (G) light-emitting diode 916 emits light in the second light source region 913, and the blue (B) light-emitting diode 917 emits light in the third light source region 914, red light, green light, and blue light are obtained in the first region 921, the second region 922, and the third region 923, respectively, in the light-emitting surface 902.

Next, FIG. 9B illustrates the first region 921, the second region 922, and the third region 923 in the light-emitting surface 902. In each of the rectangular regions, the major-axis direction and the minor-axis direction are denoted by 931 and 932, respectively.

The distribution of intensity of light emitted from the light source 911 in FIG. 9A is isotropically spread and is uniformly spread by the diffuser sheet 903, so that the first region 921, the second region 922, and the third region 923 in the light-emitting surface 902 are formed. Thus, as schematically illustrated in FIG. 9C, color mixture regions 941 are formed at boundaries between the first region 921, the second region 922, and the third region 923. Even when the number of the minor-axis directions 932 in the light sources 911 in the light source portion 901 is made smaller than the number of the major-axis directions 931, light emitted from the light source 911 is isotropically spread; thus, the color mixture regions 941 are formed.

Note that the intensity of light here corresponds to luminous flux of light emitted from a light source per unit area. When light is away from a light source, the intensity of the light is isotropically spread centering around the light source and decays in a distribution (a profile) based on the normal distribution (the Gaussian distribution) if the light is not corrected by an optical system.

Note that a distribution corresponds to the state of a cross section in the major-axis direction 931 (or the minor-axis direction 932) of the intensity of light centering around the light source. The distribution of intensity of light is isotropically spread from the light source, so that the intensity of the light decreases if correction is not particularly performed regardless of the major-axis direction or the minor-axis direction when the light is away from the light source.

Display defects due to the color mixture regions 941 might be reduced when the light sources 911 in the first light source region 912, the second light source region 913, and the third light source region 914 in the light source portion 901 that correspond to regions which might be the color mixture regions 941 illustrated in FIG. 9C are turned off in advance. In that case, light from the light sources 911 that are adjacent to the region where the light source 911 is turned off in advance leaks to the region where the light source 911 is turned off. In addition, the structure where the light sources 911 corresponding to the color mixture regions 941 are turned off in order to eliminate the color mixture regions 941 is not preferable because luminance might be lowered when some of the light sources 911 are turned off. Accordingly, in the structure where the light sources 911 corresponding to the color mixture regions 941 are turned off, a different display defect is caused, so that a display defect due to a color mixture problem is not eliminated.

Thus, it is an object of one embodiment of the present invention to propose a novel structure of a backlight unit where color-scan backlight drive is performed and a color mixture problem can be reduced.

In one embodiment of the present invention, in a backlight unit where color-scan backlight drive is performed, in order not to form a color mixture region by light from a light source, an optical system is provided between the light source and a diffuser sheet so that the light is isotropically spread. Specifically, the distribution of intensity of light in the lateral direction (the minor-axis direction) is narrowed by the optical system provided between the light source and the diffuser sheet. In addition, the distribution of intensity of light in the longitudinal direction (the major-axis direction) is made uniform by the optical system. Further, the spread of light from the light source in the minor-axis direction in which a color mixture region is formed is suppressed and luminance on a light-emitting surface in the major-axis direction is made uniform.

One embodiment of the present invention is a backlight unit which overlaps with an element substrate including a display element and includes a light source portion where light sources of a plurality of colors are arranged in matrix. The light source portion is divided into a plurality of zonal light source regions, the plurality of light source regions emit lights of different colors to the element substrate, and display regions of different colors that are divided zonally in the element substrate are formed. Between the element substrate and the light source portion, an optical system for narrowing the distribution of intensity of light emitted from the light source in the minor-axis direction in any one of the display regions of different colors that are divided zonally is provided.

One embodiment of the present invention is a backlight unit which overlaps with an element substrate including a display element and includes a light source portion where light sources of a plurality of colors are arranged in matrix. The light source portion is divided into a plurality of zonal light source regions, the plurality of light source regions emit lights of different colors to the element substrate, and display regions of different colors that are divided zonally in the element substrate are formed. Between the element substrate and the light source portion, an optical system for narrowing the distribution of intensity of light emitted from the light source in the minor-axis direction in any one of the display regions of different colors that are divided zonally and for making the distribution of the intensity of the light in the major-axis direction uniform is provided.

In one embodiment of the present invention, the optical system may be a lenticular lens.

In one embodiment of the present invention, the light source portion may overlap with the element substrate with the optical system and the diffuser sheet for diffusing light whose intensity is corrected by the optical system provided therebetween.

In one embodiment of the present invention, each of the plurality of light source regions may have any one of a plurality of different colors for color display, and adjacent light source regions have different colors from each other.

In one embodiment of the present invention, the plurality of colors for color display may be red, green, and blue.

In one embodiment of the present invention, the plurality of colors for color display may be cyan, magenta, or yellow in addition to red, green, and blue.

In one embodiment of the present invention, the light source may be a light-emitting diode.

According to one embodiment of the present invention, in the structure of a backlight unit where color-scan backlight drive is performed, a color mixture problem can be reduced. Further, luminance on a light-emitting surface in the major-axis direction can be made uniform while the color mixture problem is reduced.

BRIEF DESCRIPTION OF THE DRAWINGS

In the accompanying drawings:

FIGS. 6A1 to 6B are top views and a cross-sectional view in one embodiment of the present invention;

DETAILED DESCRIPTION OF THE INVENTION

Figure 1A:
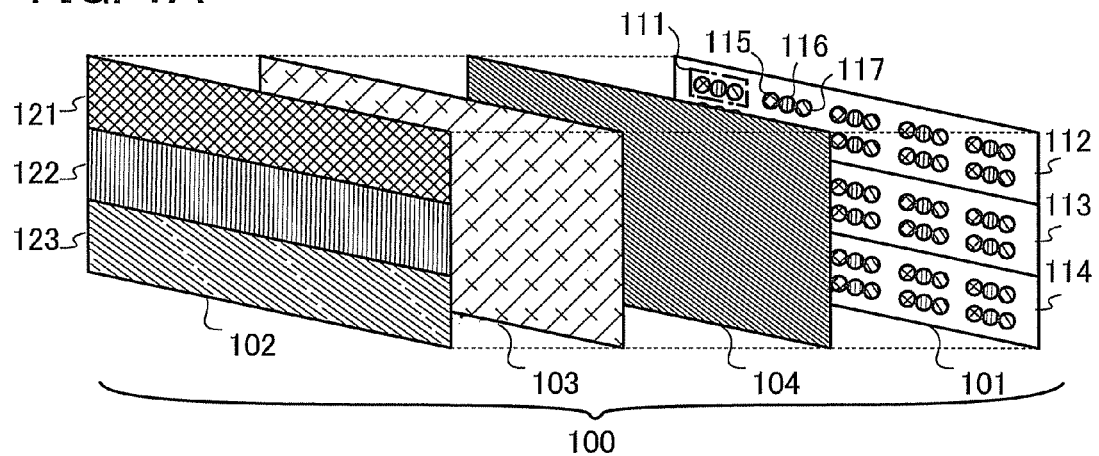
FIGS. 1A to 1C are schematic diagrams in one embodiment of the present invention.

Embodiments of the present invention will be described below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the description of the embodiments. Note that in structures of the present invention described below, reference numerals denoting the same portions are used in common in different drawings.

Note that the size, the layer thickness, or the region of each component illustrated in drawings and the like in embodiments is exaggerated for clarity in some cases. Thus, embodiments of the present invention are not limited to such scales.

Note that in this specification, terms such as "first", "second", "third", and "n-th" (n is a natural number) are used in order to avoid confusion among components and do not limit the number of components.

Embodiment 1

First, FIG. 1A is a schematic diagram illustrating the structure of a backlight unit. A light source portion 101, a light-emitting surface 102, a diffuser sheet 103, and an optical system 104 are illustrated as a backlight unit 100 in FIG. 1A. Note that FIG. 1A schematically illustrates the light-emitting surface 102 divided into a plurality of regions at the time when light from the light source portion 101 passes through the diffuser sheet 103 and the optical system 104 and is delivered to a display region, and the light-emitting surface 102 actually corresponds to a surface of the diffuser sheet 103.

Note that although not illustrated in FIG. 1A, an element substrate including a display element, that is, the display region overlaps with the backlight unit. For example, in a liquid crystal display device, an element substrate has a region where transistors for controlling transmission and non-transmission of light from a backlight unit by a liquid crystal element that is a display element are arranged in matrix, and the region serves as a display region. Note that any element can be used as the display element as long as it controls transmission or non-transmission of light. Other than a liquid crystal element, for example, a MEMS (micro electro mechanical systems) element may be used. In addition, the element substrate needs to have a property of transmitting light emitted from the backlight unit.

Note that in this specification, light emitted from the backlight unit 100 which is provided on a back side of the element substrate passes through the display element over the element substrate and is viewed. Thus, although the backlight unit 100 is referred to as a "backlight" in this embodiment, the backlight unit 100 might also be referred to as a "front light" or a "sidelight" depending on the arrangement of a light source which emits light.

In the light source portion 101 illustrated in FIG. 1A, a plurality of light sources 111 including a plurality of light sources that have color combinations for obtaining a white color by additive color mixture are arranged in matrix. In the light source portion 101, a plurality of light source regions corresponding to a plurality of regions of the light-emitting surface 102 are illustrated as a first light source region 112, a second light source region 113, and a third light source region 114. In addition, in the light source portion 101, a red (R) light-emitting diode 115, a green (G) light-emitting diode 116, and a blue (B) light-emitting diode 117 are illustrated as the light sources 111 that have the color combinations for obtaining a white color by additive color mixture.

The light source 111 may be any element as long as light emission is performed in a color combination for color display. Note that R, and B light-emitting diodes are used as the light-emitting diodes 115 to 117, and an organic EL element or the like can be used. When the light source 111 is encapsulated in an epoxy resin or the like with which a diffusing agent for diffusing light is mixed, an angle at which light is spread can be improved.

Note that the light sources 111 arranged in matrix are not necessarily arranged in matrix. The arrangement of the light sources 111 can be changed as appropriate as long as the red (R) light-emitting diode 115, the green (G) light-emitting diode 116, and the blue (B) light-emitting diode 117 are provided in the light source portion 101 and color-scan backlight drive can be performed.

Note that although the light source 111 has three colors of R, G, and B in this embodiment, a different kind of color may be combined. For example, in addition to the three colors of R, G, and B, a yellow light-emitting diode, a magenta light-emitting diode, a cyan light-emitting diode, or the like may be used. In addition to the three colors of R, G, and B, a white light-emitting diode can be used.

In the light-emitting surface 102 illustrated in FIG. 1A, for description of color-scan backlight drive, a first region 121, a second region 122, and a third region 123 are illustrated as regions corresponding to the first light source region 112, the second light source region 113, and the third light source region 114 in the light source portion 101. For example, when the red (R) light-emitting diode 115 emits light in the first light source region 112, the green (G) light-emitting diode 116 emits light in the second light source region 113, and the blue (B) light-emitting diode 117 emits light in the third light source region 114 at the same time in a period, red light, green light, and blue light are obtained in the first region 121, the second region 122, and the third region 123, respectively, in the light-emitting surface 102. Note that in the color-scan backlight drive, the colors of lights emitted in the first region 121 to the third region 123 are changed over time.

Note that as illustrated in FIG. 1A, the first light source region 112 to the third light source region 114 is divided from the light source portion 101 extending in a direction parallel to the longitudinal direction of the light source portion 101 to be a plurality of zonal regions. In other words, the longitudinal direction of the light source portion 101 corresponds the longitudinal directions of the first light source region 112 to the third light source region 114. Similarly, the first region 121 to the third region 123 is divided to be a plurality of zonal regions in accordance with the first light source region 112 to the third light source region 114. In other words, the longitudinal direction of the light-emitting surface 102 corresponds to the longitudinal directions of the first region 121 to the third region 123, and the longitudinal directions of the first light source region 112 to the third light source region 114 correspond to the longitudinal directions of the first region 121 to the third region 123. When the colors of lights emitted from the light sources 111 are changed in the first light source region 112 to the third light source region 114, the first region 121 to the third region 123 emit lights of different colors.

Note that the first region 121 to the third region 123 of the light-emitting surface 102 correspond to the display region of the element substrate which overlaps with the backlight unit 100 and includes a display element. In other words, as in the first region 121 to the third region 123, the display region of the element substrate is divided into a plurality of zonal regions extending in a direction parallel to the longitudinal direction of. the display region. The display region of the element substrate that is divided zonally is controlled with video signals corresponding to the light sources of different colors.

The diffuser sheet 103 may be any sheet as long as it diffuses incident light. For example, a sheet whose surface is coated with a resin or the like for diffusing light may be used. Note that the plurality of diffuser sheets 103 may be provided between the light source portion 101 and the light-emitting surface 102. In addition, a space between the plurality of diffuser sheets 103 is filled with an epoxy resin, air, or the like so that light can be diffused.

The optical system 104 is provided to process the distribution of intensity of light emitted from the light source 111. Specifically, the optical system 104 processes the distribution of intensity of light so that light emitted from the light source 111 is isotropically spread centering around the light source and, for example, the distribution of intensity of light in one direction is narrowed.

Note that the intensity of light here corresponds to luminous flux of light emitted from a light source per unit area. When light is away from a light source, the intensity of the light is isotropically spread centering around the light source and decays in a distribution (a profile) based on the normal distribution (the Gaussian distribution) if the light is not corrected by an optical system.

Figure 1B:
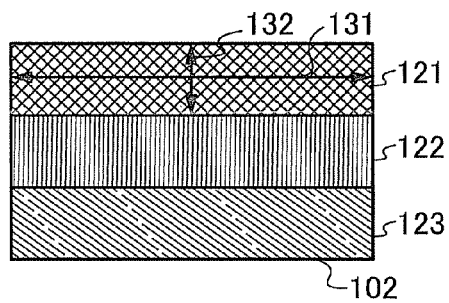

Next, for description of the optical system 104 illustrated in FIG. 1A, FIG. 1B illustrates the first region 121, the second region 122, and the third region 123 in the light-emitting surface 102. In each of the rectangular regions, the major-axis direction and the minor-axis direction are denoted by 131 and 132, respectively.

Note that a distribution corresponds to the state of a cross section in the major-axis direction 131 (or the minor-axis direction 132) of the intensity of light centering around the light source. The distribution of intensity of light is isotropically spread from the light source, so that the intensity of the light decreases if correction is not particularly performed regardless of the major-axis direction or the minor-axis direction when the light is away from the light source.

With reference to FIG. 1B, the optical system 104 illustrated in FIG. 1A processes light emitted from the light source 111 so that the distribution of intensity of the light in the minor-axis direction 132 in any one of the zonally divided display regions of different colors is narrowed. In addition, the optical system 104 illustrated in FIG. 1A is provided such that light is anisotropically emitted to the diffuser sheet 103 by processing the distribution of intensity of the light in the major-axis direction 131 for uniform distribution.

Figure 1C:
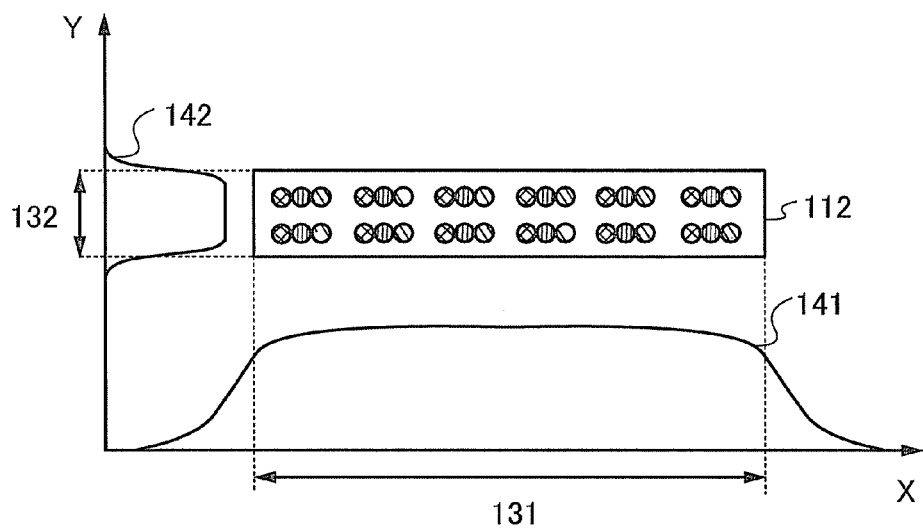

In other words, with the optical system 104, before light emitted from the first light source region 112 enters the diffuser sheet 103, as illustrated in FIG. 1C, the light is processed into a distribution 141 in the major-axis direction 131 and is processed into a distribution 142 in the minor-axis direction 132. Light emitted from the second light source region 113 and the third light source region 114 is processed in a manner similar to that of the light emitted from the first light source region 112.

Light emitted from the first light source region 112 to the third light source region 114 needs to be uniform in the major-axis direction 131; thus, processing with the optical system is needed so that the distribution of intensity of the light in the major-axis direction 131 is widened. On the other hand, in order to suppress formation of color mixture regions, light emitted from the first light source region 112 to the third light source region 114 needs processing with the optical system so that the distribution of intensity of the light in the minor-axis direction 132 is narrowed. As illustrated in FIG. 1C, when the distribution of intensity of light is narrowed so that the bottom of the distribution 142 of intensity of light in the minor-axis direction 132 is not stretched, formation of color mixture regions can be suppressed. Further, as illustrated in FIG. 1C, when the distribution of intensity of light is widened so that the bottom of the distribution 141 of intensity of light in the major-axis direction 131 is stretched, the intensity of light in the light source region can be made uniform.

Thus, in the structure of a backlight unit where color-scan backlight drive is performed, a color mixture problem can be reduced. Further, luminance on a light-emitting surface in the major-axis direction can be made uniform while the color mixture problem is reduced.

Figure 2A:
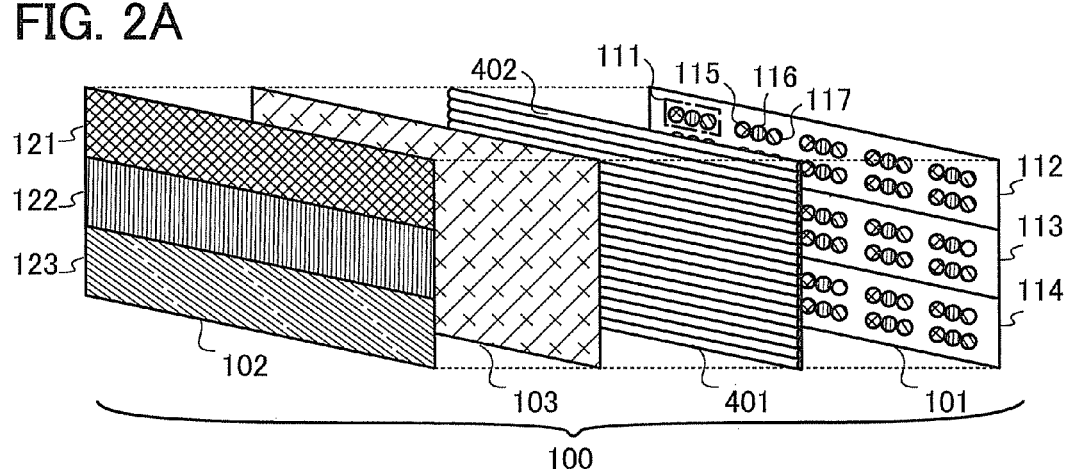
FIGS. 2A to 2D are schematic diagrams in one embodiment of the present invention.

Here, FIG. 2A is a schematic diagram illustrating a specific example of the optical system 104 in FIG. 1A. The schematic diagram in FIG. 2A illustrates a lenticular lense 402 including a plurality of cylindrical lenses extending in the major-axis direction 131 in combination in the minor-axis direction, as an optical system 401.

Note that although FIG. 2A illustrates a structure in which the one lenticular lens 402 is provided between the light source portion 101 and the diffuser sheet 103 as the optical system 401, processing of the distribution of intensity of light that is similar to the processing in the structure can be performed in a combination of a plurality of lenses.

Figure 2B:
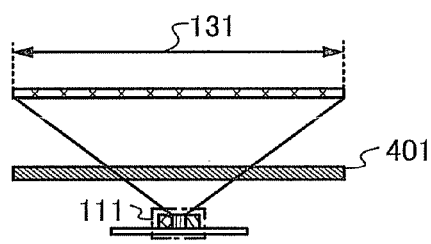

FIG. 2B is a cross-sectional view of the major-axis direction 131 in the schematic diagram in FIG. 2A and visually illustrates light emitted from the light source 111 by a solid line. As illustrated in FIG. 2B, light emitted from the light source 111 enters the diffuser sheet 103 without being corrected by the optical system 401 made of lenticular lenses. In other words, light emitted from the light source 111 is isotropically spread in accordance with the distance from the light source.

Figure 2C:
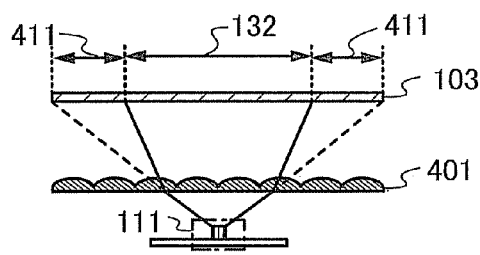

On the other hand, FIG. 2C is a cross-sectional view of the minor-axis direction 132 in the schematic diagram in FIG. 2A and visually illustrates light emitted from the light source 111 by a solid line. As illustrated in FIG. 2C, light emitted from the light source 111 is narrowed by the amount indicated by a region 411 by the optical system 401 made of lenticular lenses in the minor-axis direction 132. In other words, the distribution of intensity of light is narrowed by the amount indicated by the region 411 in FIG. 2B in the minor-axis direction 132. Note that FIG. 2C illustrates the case where light emitted from the light source 111 is isotropically spread in accordance with the distance from the light source 111 without provision of the optical system 401 by a broken line. In that case, the region 411 in FIG. 2C corresponds to a region where a mixture region obtained by mixture of lights of different colors is generated.

Figure 2D:
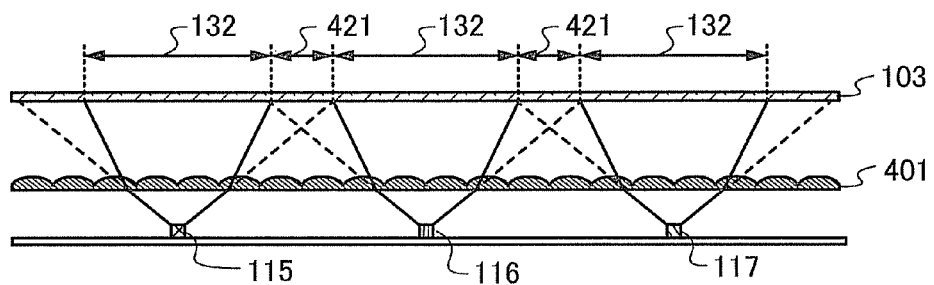

Next, FIG. 2D is a schematic diagram in which lights emitted from the red (R) light-emitting diode 115, the green (G) light-emitting diode 116, and the blue (B) light-emitting diode 117 in the light source 111 are illustrated by solid lines and the lights are made not to overlap with the diffuser sheet 103 in the minor-axis direction 132 by the optical system 401 made of lenticular lenses. As illustrated in FIG. 2C, lights emitted from the light-emitting diodes of the colors in the light source 111 are narrowed by the optical system 401 made of lenticular lenses in the minor-axis direction 132. In other words, the distributions of intensity of lights emitted from the light-emitting diodes of the colors are narrowed in the minor-axis direction 132. Thus, without formation of a color mixture region, the intensity of light in a region where light is delivered can be improved.

In addition, FIG. 2D illustrates the case where lights emitted from the light-emitting diodes of the colors in the light source 111 are isotropically spread without provision of the optical system 401 by broken lines. In the case where the optical system 401 is not provided, which is described with reference to FIG. 2C, a mixture region is formed by overlapping of lights emitted from the light sources, and a region 421 in FIG. 2D is a mixture region obtained by mixture of lights emitted from the red (R) light-emitting diode 115, the green (G) light-emitting diode 116, and the blue (B) light-emitting diode 117.

As described above, from FIGS. 2B to 2D, with provision of the optical system 401, the distribution of intensity of light in the minor-axis direction can be narrowed and formation of a mixture region can be suppressed.

Note that the intensity of light that is narrowed by the optical system 401 may be designed by appropriate adjustment of the distance between the optical system 401 and the light source 111 or the distance between the optical system 401 and the diffuser sheet 103 in accordance with the length of the minor-axis direction 132 in any one of the first region 121, the second region 122, and the third region 123.

Note that as the cylindrical lens of the optical system 401 in FIGS. 2A and 2B, an achromatic lens obtained by a combination of lenses that differ in light dispersion may be used. With the use of an achromatic lens, a discrepancy in focal length of a lens that is caused by a difference in wavelength of R, G, and B light sources can be reduced.

Next, processing of the distribution of intensity of light from the light source by the optical system 104 is described in detail with reference to FIGS. 3A to 3C and FIGS. 4A to 4C.

Figure 3A:
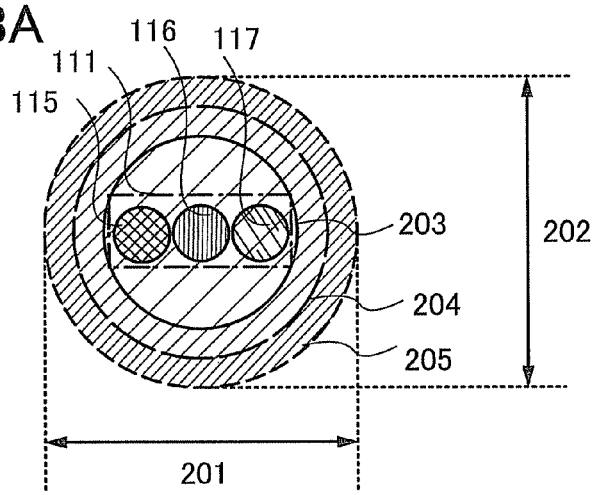
FIGS. 3A to 3C are schematic diagrams in one embodiment of the present invention.
Figure 3B:
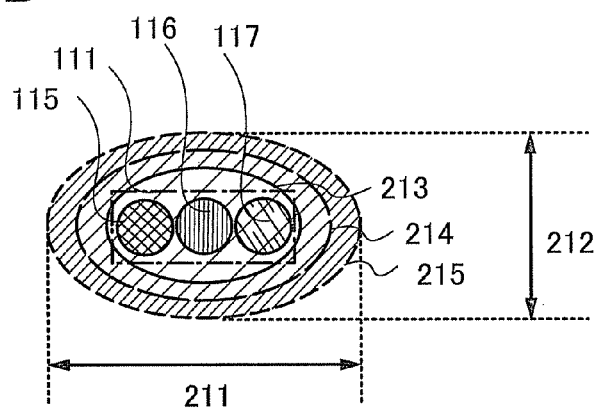

FIGS. 3A and 3B are each a schematic diagram of one of the light sources 111 and the distribution of intensity of light emitted from the light source. Note that FIG. 3A is a schematic diagram of the distribution of intensity of light from the light source at the time when an optical system is not provided between a light source portion and a diffuser sheet. FIG. 3B is a schematic diagram of the distribution of intensity of light from the light source at the time when an optical system is provided between a light source portion and a diffuser sheet.

FIG. 3A is a schematic diagram of the distribution of intensity of light that is isotropically spread by light emission of any one of the red (R) light-emitting diode 115, the green (G) light-emitting diode 116, and the blue (B) light-emitting diode 117 in the light source 111. In addition, FIG. 3A illustrates the major-axis direction 201 and the minor-axis direction 202 in the light source 111. Specifically, FIG. 3A schematically illustrates the case where light intensities 203 to 205 are annularly spread in the major-axis direction 201 and the minor-axis direction 202. Note that the distributions of the light intensities 203 to 205 in FIG. 3A are indicated by contour lines formed by connection of points with the same light intensity.

FIG. 3B is a schematic diagram of the distribution of intensity of light that is anisotropically spread by light emission of any one of the red (R) light-emitting diode 115, the green (G) light-emitting diode 116, and the blue (B) light-emitting diode 117 in the light source 111. In addition, FIG. 3B illustrates the major-axis direction 211 and the minor-axis direction 212 in the light source 111. Specifically, FIG. 3B schematically illustrates the case where the space between light intensities 213 to 215 is opened up in the major-axis direction 211 by an optical system, the space between the light intensities 213 to 215 is lessened in the minor-axis direction 212 by the optical system, and the light intensities 213 to 215 forms an ellipse. Note that the distributions of the light intensities 213 to 215 in FIG. 3B are indicated by contour lines formed by connection of points with the same light intensity.

As described above, the optical system in the structure of this embodiment makes the intensity of light uniform in the major-axis direction and narrows the intensity of light in the minor-axis direction. In other words, by the optical system 104 in the structure of this embodiment, lights emitted from the light source 111 are processed as illustrated in FIG. 3B before entering the diffuser sheet 103.

Figure 3C:
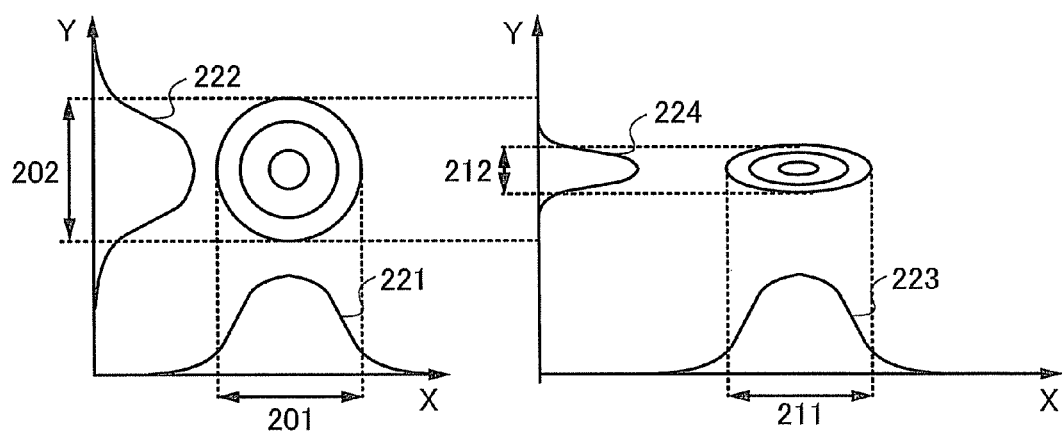

For specific description, FIG. 3C illustrates the distributions of intensity of light in a structure where an optical system is not provided (a distribution 221 in the major-axis direction 201 and a distribution 222 in the minor-axis direction 202 on the left side in FIG. 3C) and the distributions of intensity of light in a structure where an optical system is provided (a distribution 223 in the major-axis direction 211 and a distribution 224 in the minor-axis direction 212 on the right side in FIG. 3C). Note that in FIG. 3C, the X-axis represents the major-axis direction and the Y-axis represents the minor-axis direction.

As is clear from the distributions of intensity of light emitted from the light source based on the presence or absence of the optical system in FIG. 3C, the optical system in this embodiment narrows the distribution 222 of intensity of light in the minor-axis direction 202 to the distribution 224 of intensity of light in the minor-axis direction 212 in each light source. Further, the optical system in this embodiment widens the distribution 221 of intensity of light in the major-axis direction 201 to the distribution 223 of intensity of light in the major-axis direction 211 in each light source. Note that although FIG. 3C illustrates the distribution 221 and the distribution 223 in the same size, the bottom of the distribution 223 is preferably processed to be stretched.

Next, the case where the distributions of intensity of light in the light sources in FIGS. 3A to 3C are considered as the distribution of intensity of light in the entire light source portion is described with reference to FIGS. 4A to 4C.

Figure 4A:
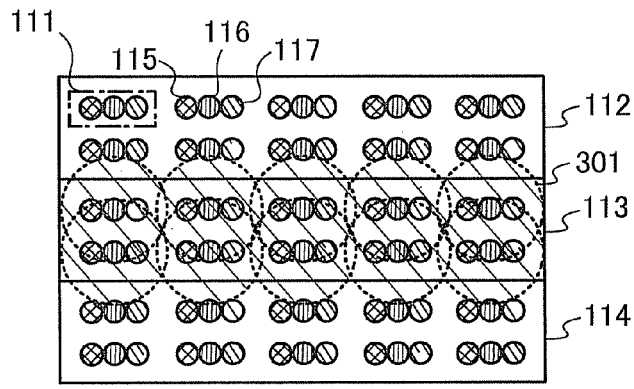
FIGS. 4A to 4C are schematic diagrams in one embodiment of the present invention.
Figure 4B:
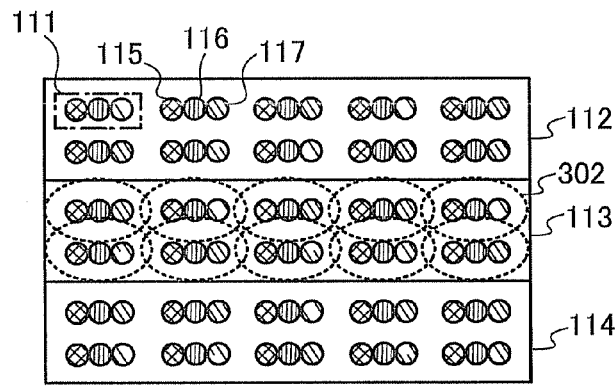

FIG. 4A is a schematic diagram of a light source portion at the time when an optical system is not provided between the light source portion and the diffuser sheet in FIG. 3A. Since the optical system is not provided in FIG. 4A as in FIG. 3A, the distribution of light intensity 301 is annularly spread.

FIG. 4A is a schematic diagram of a light source portion at the time when an optical system is provided between the light source portion and the diffuser sheet in FIG. 3B. Since the optical system is provided in FIG. 4B as in FIG. 3B, the distribution of light intensity 302 is elliptically spread. As illustrated in FIG. 4B, the optical system in the structure of this embodiment makes the intensities of lights emitted from the light sources uniform individually in the major-axis direction and narrows the intensities of lights in the minor-axis direction.

Figure 4C:
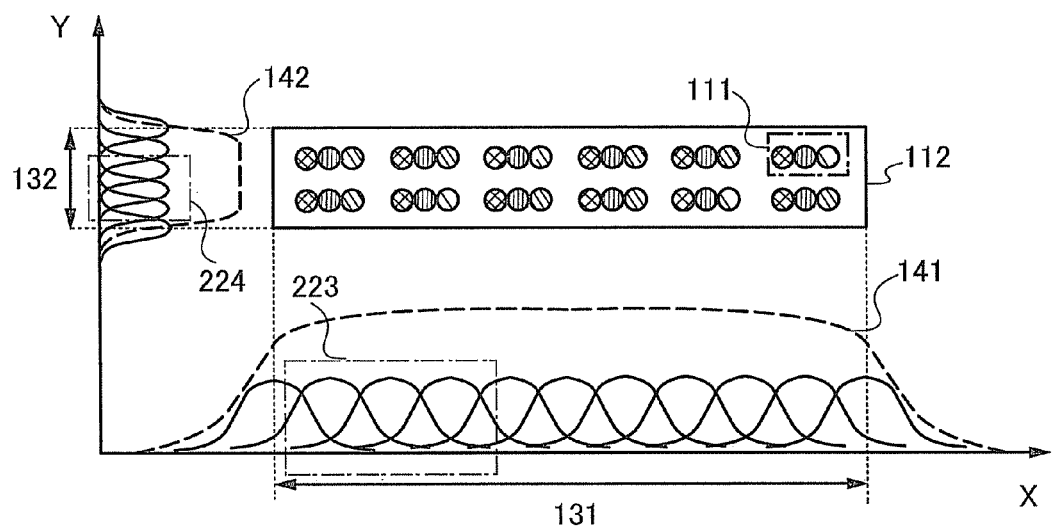

For specific description, FIG. 4C illustrates the distributions of intensity of light (the distribution 141 in the major-axis direction 131 and the distribution 142 in the minor-axis direction 132) at the time when the distributions of intensity of light in the light sources are seen from the first light source region 112 in the light source portion and the distributions of intensity of light in the light sources (the distribution 223 in the major-axis direction 131 and the distribution 224 in the minor-axis direction 132). Note that in FIG. 4C, the X-axis represents the major-axis direction and the Y-axis represents the minor-axis direction. In other words, in FIG. 4C, the distribution 141 of intensity of light in the major-axis direction 131 is obtained by overlapping of the distributions 223 of intensity of light. In addition, the distribution 142 of intensity of light in the minor-axis direction 132 is obtained by overlapping of the distributions 224 of intensity of light.

Thus, in the major-axis direction 131, the distribution 141 of intensity of light can be made uniform. In addition, in the minor-axis direction 132, the distribution 142 of intensity of light can be narrowed and the bottom of the distribution of intensity of light can be prevented from being stretched; thus, color mixture in a color mixture region can be suppressed. Note that in the minor-axis direction 132, after the distribution 142 of intensity of light is narrowed by the optical system and the bottom of the distribution of intensity of light is prevented from being stretched, the distribution 142 of intensity of light can be made uniform by the diffuser sheet.

Note that although in the minor-axis direction 132, the bottom of the distribution of intensity of light might be a black region when the distribution 142 of intensity of light is narrowed, the area of the black region can be made smaller than an area at the time when a light source corresponding to the black region is turned off, so that images can be displayed without problems.

As described above, in the structure of the backlight unit in this embodiment where color-scan backlight drive is performed, a color mixture problem can be reduced. Further, luminance on a light-emitting surface in the major-axis direction can be made uniform while the color mixture problem is reduced.

This embodiment can be combined with any of the structures described in the other embodiments as appropriate.

Embodiment 2

In this embodiment, a block diagram of a display device including an element substrate provided with a display element that overlaps with the backlight unit is described. Note that a liquid crystal element is used as the display element included in the element substrate. Note that in the structure of this embodiment, any element can be used as the display element as long as it controls transmission or non-transmission of light. Other than a liquid crystal element, a MEMS (micro electro mechanical systems) element may be used.

Figure 5:
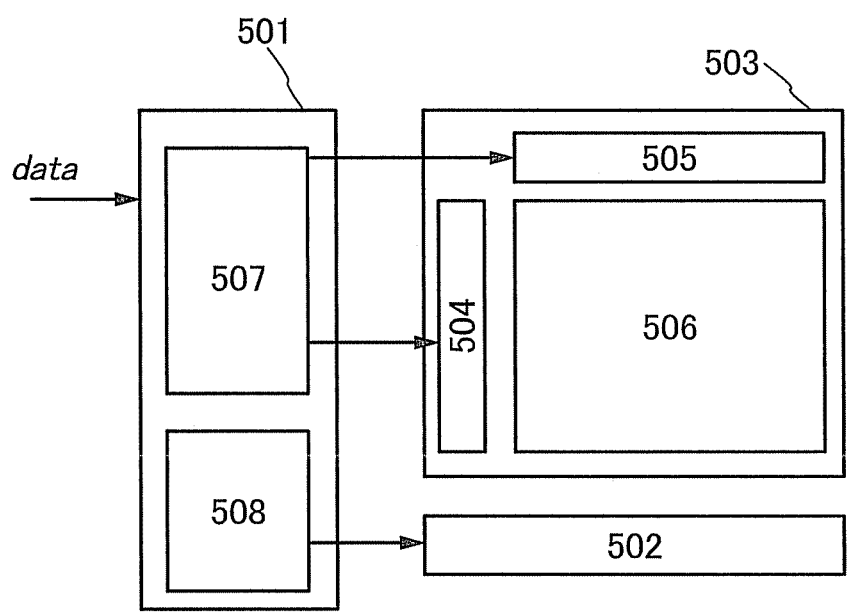
FIG. 5 is a block diagram in one embodiment of the present invention.

A block diagram in FIG. 5 illustrates a display control circuit 501, a backlight unit 502, and an element substrate 503.

A video control signal and a video signal (data in FIG. 5) are input from the outside to the display control circuit 501 in the block diagram illustrated in FIG. 5. The display control circuit 501 includes a display drive control circuit 507 for driving a scan line driver circuit 504 and a data line driver circuit 505, and a backlight drive control circuit 508 for generating a signal for lighting a light source included in the backlight unit 502 in accordance with the video signal.

The element substrate 503 in the block diagram in FIG. 5 includes the scan line driver circuit 504, the data line driver circuit 505, and a display region 506.

Note that the scan line driver circuit 504 and the data line driver circuit 505 are not necessarily formed over the same substrate as the display region 506. The scan line driver circuit 504 includes a plurality of divided scan line driver circuits in a method by which pixels of rows in a plurality of pixel regions of the display region 506 are concurrently selected and driven.

The display drive control circuit 507 is a circuit for driving the scan line driver circuit 504 and the data line driver circuit 505 at a predetermined timing so that images are displayed in the display region 506 based on video signals. The backlight drive control circuit 508 is a circuit for driving the backlight unit 502 in accordance with the timing at which the scan line driver circuit 504 and the data line driver circuit 505 are driven.

Note that the display control circuit 501 might further include a circuit for adjusting and/or converting video signals input. Specifically, the display control circuit 501 might further include a circuit for converting input video signals data if the signals are not video signals of predetermined colors and for performing image processing such as gamma correction or luminance conversion on colors. The video signals of predetermined colors are video signals corresponding to colors of light sources included in the backlight unit.

As described above, when the structure of this embodiment is combined with the structure of Embodiment 1, color mixture in a boundary portion of light sources can be suppressed and display quality can be improved when light sources of a backlight portion are divided into a plurality of regions and lights of a plurality of colors are emitted.

This embodiment can be combined with any of the structures described in the other embodiments as appropriate.

Embodiment 3

In this embodiment, an element substrate including a display element that is used in combination with the backlight unit described in the above embodiment is described. Note that a combination of the backlight unit described in the above embodiment and an element substrate including a liquid crystal element described in this embodiment is referred to as a liquid crystal display device.

Figure 6B:
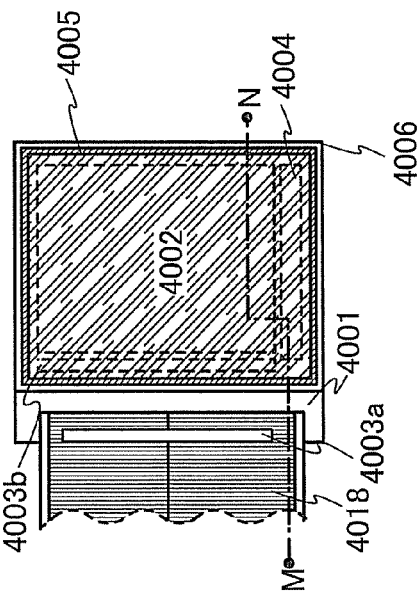
Figure 6B:
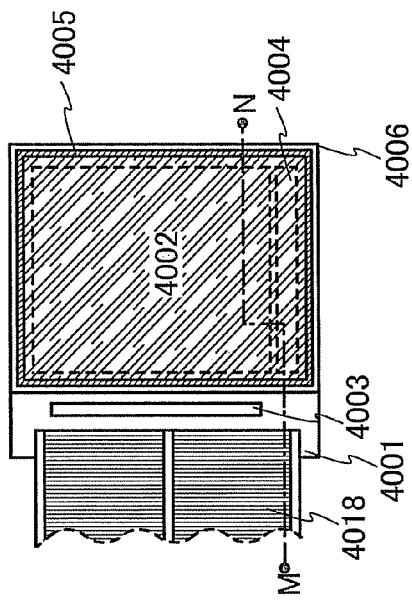
Figure 6B:
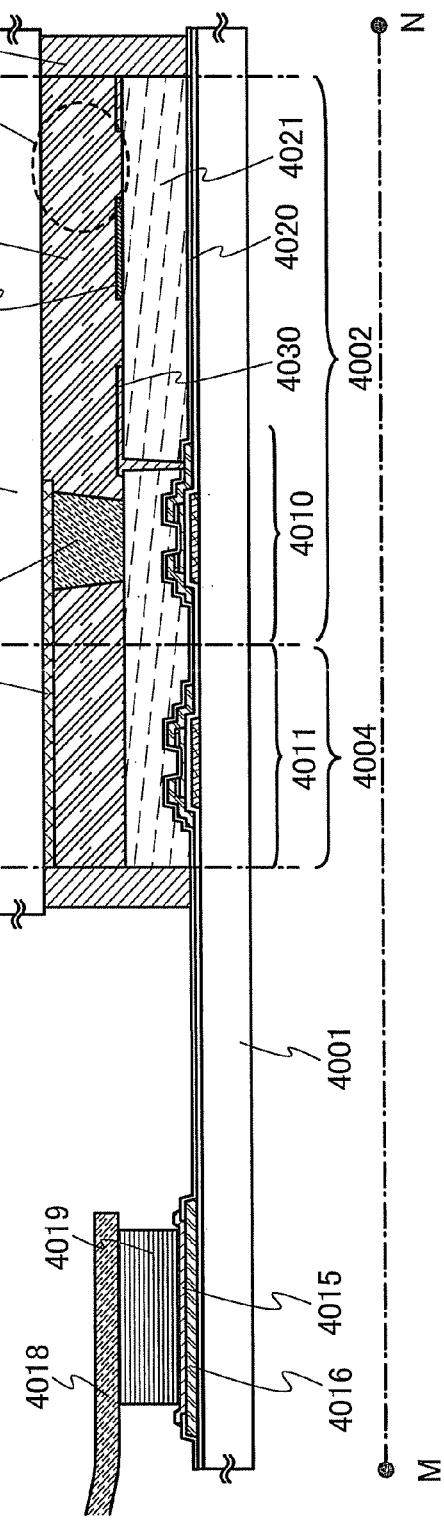

The appearance and a cross section of an element substrate of a liquid crystal display device are described with reference to FIGS. 6A1, 6A2, and 6B. FIGS. 6A1 and 6A2 are top views of panels in which transistors 4010 and 4011 and a liquid crystal element 4013 which are formed over a first substrate 4001 are sealed between the first substrate 4001 and a second substrate 4006 with a sealant 4005. FIG. 6B is a cross-sectional view taken along line M-N in FIGS. 6A1 and 6A2.

The sealant 4005 is provided to surround a pixel portion 4002 and a scan line driver circuit 4004 provided over the first substrate 4001. In addition, the second substrate 4006 is provided over the pixel portion 4002 and the scan line driver circuit 4004. The pixel portion 4002 and the scan line driver circuit 4004 are sealed together with a liquid crystal layer 4008 by the first substrate 4001, the sealant 4005, and the second substrate 4006.

In FIG. 6A1, a signal line driver circuit 4003 formed using a single crystal semiconductor film or a polycrystalline semiconductor film over a substrate separately prepared is mounted in a region which is different from the region surrounded by the sealant 4005 over the first substrate 4001. Note that FIG. 6A2 illustrates an example in which part of a signal line driver circuit is formed over the first substrate 4001 with the use of a transistor including an oxide semiconductor. A signal line driver circuit 4003b is formed over the first substrate 4001 and a signal line driver circuit 4003a formed using a single crystal semiconductor film or a polycrystalline semiconductor film is mounted on the substrate separately prepared.

Note that there is no particular limitation on the connection method of a driver circuit which is separately formed, and a COG method, a wire bonding method, a TAB method, or the like can be used. FIG. 6A1 illustrates an example in which the signal line driver circuit 4003 is mounted by a COG method. FIG. 6A2 illustrates an example in which the signal line driver circuit 4003 is mounted by a TAB method.

The pixel portion 4002 and the scan line driver circuit 4004 provided over the first substrate 4001 include a plurality of transistors. FIG. 6B illustrates the transistor 4010 included in the pixel portion 4002 and the transistor 4011 included in the scan line driver circuit 4004. Insulating layers 4020 and 4021 are provided over the transistors 4010 and 4011.

There is no particular limitation on the kind of the transistors 4010 and 4011, and a variety of transistors can be employed. A semiconductor such as silicon (e.g., amorphous silicon, microcrystalline silicon, or polysilicon) or an oxide semiconductor can be used for a channel layer of each of the transistors 4010 and 4011.

In addition, a pixel electrode layer 4030 and a common electrode layer 4031 are provided over the first substrate 4001, and the pixel electrode layer 4030 is electrically connected to the transistor 4010. The liquid crystal element 4013 includes the pixel electrode layer 4030, the common electrode layer 4031, and the liquid crystal layer 4008.

In a liquid crystal display device including the liquid crystal layer 4008 which exhibits a blue phase, a method in which gradation is controlled by generation of an electric field generally parallel (i.e., in a horizontal direction) to a substrate to move liquid crystal molecules in a plane parallel to the substrate can be used. For such a method, an electrode structure used in an in plane switching (IPS) mode illustrated in FIGS. 6A1, 6A2, and 6B is employed in this embodiment. Note that without limitation to the IPS mode, an electrode structure used in a fringe field switching (FFS) mode can be employed.

As the first substrate 4001 and the second substrate 4006, glass, plastic, or the like having a light-transmitting property can be used. As plastic, polyether sulfone (PES), polyimide, a fiberglass-reinforced plastics (FRP) plate, a polyvinyl fluoride (PVF) film, a polyester film, or an acrylic resin film can be used. Alternatively, a sheet with a structure in which an aluminum foil is sandwiched between PVF films or polyester films can be used.

Further, a columnar spacer 4035 which is provided to control the thickness (a cell gap) of the liquid crystal layer 4008 can be obtained by selective etching of an insulating film. Note that a spherical spacer may be used instead of the columnar spacer 4035.

In FIGS. 6A1, 6A2, and 6B, a light-blocking layer 4034 is provided on the second substrate 4006 side to cover the transistors 4010 and 4011. With provision of the light-blocking layer 4034, the effect of stabilizing the characteristics of the transistors can be increased. The light-blocking layer 4034 may be provided over the first substrate 4001. In that case, when polymer stabilization is performed by irradiation with ultraviolet rays from the second substrate 4006 side, a liquid crystal over the light-blocking layer 4034 can also be polymer-stabilized when it exhibits a blue phase.

The transistors 4010 and 4011 may be covered with an insulating layer 4020 serving as a protective film; however, this embodiment is not particularly limited to such a structure.

Note that the protective film is provided to prevent entry of contaminant impurities such as an organic substance, metal, or moisture existing in the air and is preferably a dense film. The protective film may be a single layer or a stacked layer of a silicon oxide film, a silicon nitride film, a silicon oxynitride film, a silicon nitride oxide film, an aluminum oxide film, an aluminum nitride film, an aluminum oxynitride film, or an aluminum nitride oxide film by sputtering.

After the protective film is formed, a semiconductor layer may be annealed (at 300 to 400° C.).

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (ITO), indium zinc oxide, or indium tin oxide to which silicon oxide is added.

A conductive composition containing a conductive high molecule (also referred to as a conductive polymer) can be used for the pixel electrode layer 4030 and the common electrode layer 4031.

Further, a variety of signals and potentials are supplied to the signal line driver circuit 4003 which is formed separately, the scan line driver circuit 4004, or the pixel portion 4002 from an FPC 4018.

Further, since the transistor is easily damaged by static electricity or the like, a protection circuit for protecting the driver circuits is preferably formed over the same substrate as a gate line or a source line. The protection circuit is preferably formed using a non-linear element including an oxide semiconductor.

In FIGS. 6A1, 6A2, and FIG. 6B, a connection terminal electrode 4015 is formed using the same conductive film as the pixel electrode layer 4030, and a terminal electrode 4016 is formed using the same conductive film as source and drain electrode layers of the transistors 4010 and 4011.

The connection terminal electrode 4015 is electrically connected to a terminal of the FPC 4018 through an anisotropic conductive film 4019.

Note that FIGS. 6A1, 6A2, and 6B illustrate an example in which the signal line driver circuit 4003 is formed separately and mounted on the first substrate 4001; however, this embodiment is not limited to this structure. The scan line driver circuit may be formed separately and mounted, or only part of the signal line driver circuit or part of the scan line driver circuit may be formed separately and mounted.

Figure 7:
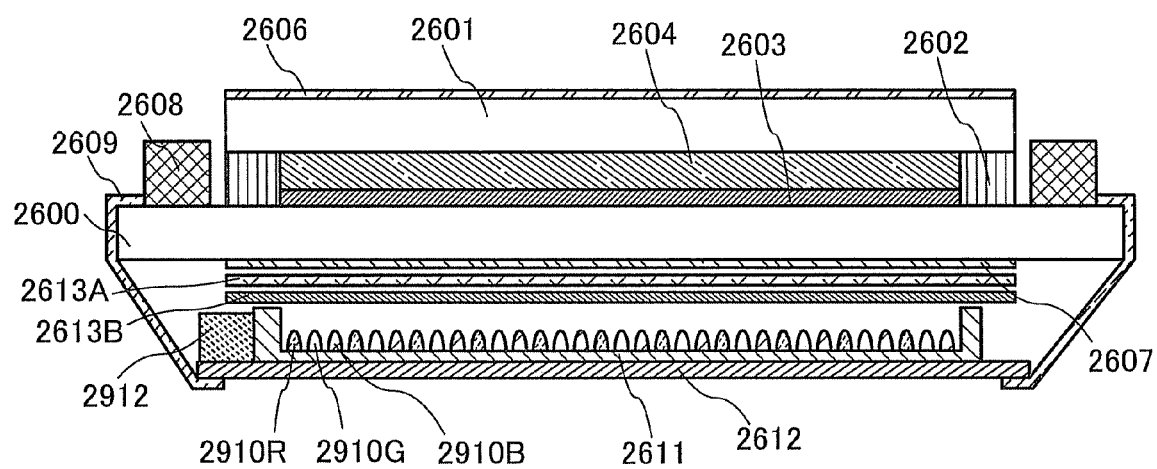
FIG. 7 is a cross-sectional view in one embodiment of the present invention.

FIG. 7 illustrates an example of a cross-sectional structure of a liquid crystal display device in which an element substrate 2600 and a counter substrate 2601 are attached to each other with a sealant 2602, and an element layer 2603 including a transistor or the like and a liquid crystal layer 2604 are provided between the substrates.

As described in the above embodiment, light-emitting diodes emitting lights of a plurality of colors are provided as light sources of a backlight unit. As the light-emitting diodes emitting lights of a plurality of colors, a red light-emitting diode 2910R, a green light-emitting diode 2910G, and a blue light-emitting diode 2910B are provided.

A polarizing plate 2606 is provided on the outer side of the counter substrate 2601, and a polarizing plate 2607, a diffuser sheet 2613A, and an optical system 2613B are provided on the outer side of the element substrate 2600. A light source portion is formed using the red light-emitting diode 2910R, the green light-emitting diode 2910G, the blue light-emitting diode 2910B, and a reflector 2611. A backlight drive control circuit 2912 provided for a circuit board 2612 is connected to a wiring circuit portion 2608 of the element substrate 2600 through a flexible wiring board 2609 and further includes an external circuit such as a control circuit or a power source circuit.

With the backlight drive control circuit 2912, in a period, the light source portion of the backlight unit can be controlled while lights of different colors are emitted in the divided light source regions. When the light-emitting diodes emit light separately, a field-sequential liquid crystal display device can be obtained.

As described above, when the structure of this embodiment is combined with the structure of Embodiment 1, color mixture in a boundary portion of the plurality of light source regions can be suppressed and display quality can be improved when light source portionn of a backlight portion are divided into a plurality of light source regions and lights of a plurality of colors are emitted.

This embodiment can be combined with any of the structures described in the other embodiments as appropriate.

Embodiment 4

A display device including a backlight unit disclosed in this specification can be used in a variety of electronic devices (including game machines). Examples of electronic devices are a television set (also referred to as a television or a television receiver), a monitor of a computer or the like, a camera such as a digital camera or a digital video camera, a digital photo frame, a cellular phone handset (also referred to as a cellular phone or a cellular phone device), a portable game machine, a personal digital assistant, an audio reproducing device, a large game machine such as a pinball machine, and the like. Examples of electronic devices each including the display device described in the above embodiment are described.

Figure 8A:
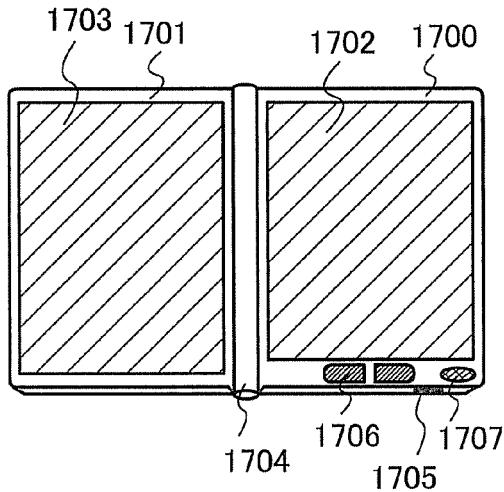
FIGS. 8A to 8D illustrate electronic devices in one embodiment of the present invention.

FIG. 8A illustrates an example of an e-book reader. The e-book reader illustrated in FIG. 8A includes two housings 1700 and 1701. The housings 1700 and 1701 are combined with each other with a hinge 1704 so that the e-book reader can be opened and closed. With such a structure, the e-book reader can operate like a paper book.

A display region 1702 and a display region 1703 are incorporated in the housing 1700 and the housing 1701, respectively. The display region 1702 and the display region 1703 may display one image or different images. In the case where the display region 1702 and the display region 1703 display different images, for example, a display portion on the right side (the display region 1702 in FIG. 8A) can display text and a display portion on the left side (the display region 1703 in FIG. 8A) can display images.

FIG. 8A illustrates an example in which the housing 1700 includes an operation portion and the like. For example, the housing 1700 includes a power input terminal 1705, operation keys 1706, a speaker 1707, and the like. With the operation key 1706, pages can be turned. Note that a keyboard, a pointing device, or the like may be provided on the same surface as the display region of the housing. Further, an external connection terminal (e.g., an earphone terminal, a USB terminal, or a terminal that can be connected to a variety of cables such as USB cables), a recording medium insertion portion, or the like may be provided on a back surface or a side surface of the housing. Further, the e-book reader illustrated in FIG. 8A may function as an electronic dictionary.

Figure 8B:
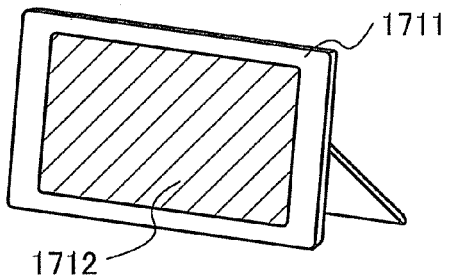

FIG. 8B illustrates an example of a digital photo frame including a display device that includes a backlight unit disclosed in this specification. For example, in the digital photo frame illustrated in FIG. 8B, a display region 1712 is incorporated in a housing 1711. The display region 1712 can display a variety of images. For example, the display region 1712 can display data of images taken with a digital camera or the like, so that the digital photo frame can function as a normal photo frame.

Note that the digital photo frame illustrated in FIG. 8B includes an operation portion, an external connection terminal (e.g., a USB terminal or a terminal that can be connected to a variety of cables such as USB cables), a recording medium insertion portion, and the like. Although these components may be provided on the same surface as the display region, it is preferable to provide them on a side surface or a back surface for the design of the digital photo frame. For example, a memory for storing data of images taken with a digital camera is inserted in the recording medium insertion portion of the digital photo frame, so that the image data can be transferred and then displayed on the display region 1712.

Figure 8C:
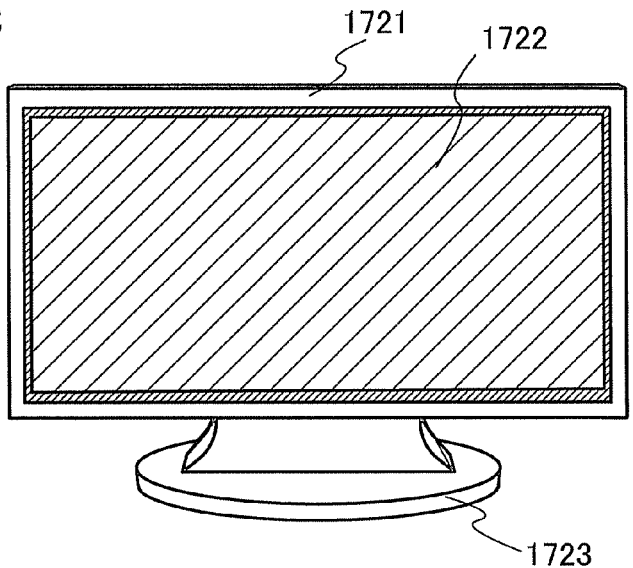

FIG. 8C illustrates an example of a television set including a display device that includes a backlight unit disclosed in this specification. In the television set illustrated in FIG. 8C, a display region 1722 is incorporated in a housing 1721. The display region 1722 can display images. Further, the housing 1721 is supported by a stand 1723 here.

The television set illustrated in FIG. 8C can be operated by an operation switch of the housing 1721 or a separate remote control. Channels and volume can be controlled with operation keys of the remote control, so that images displayed on the display region 1722 can be controlled. Further, the remote control may include a display region for displaying data output from the remote control.

Figure 8D:
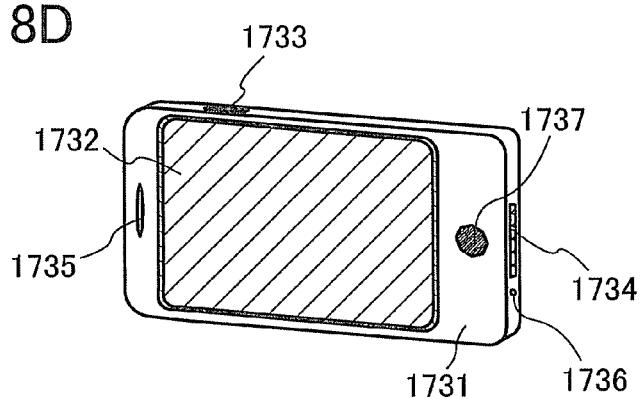
Figure 9A:
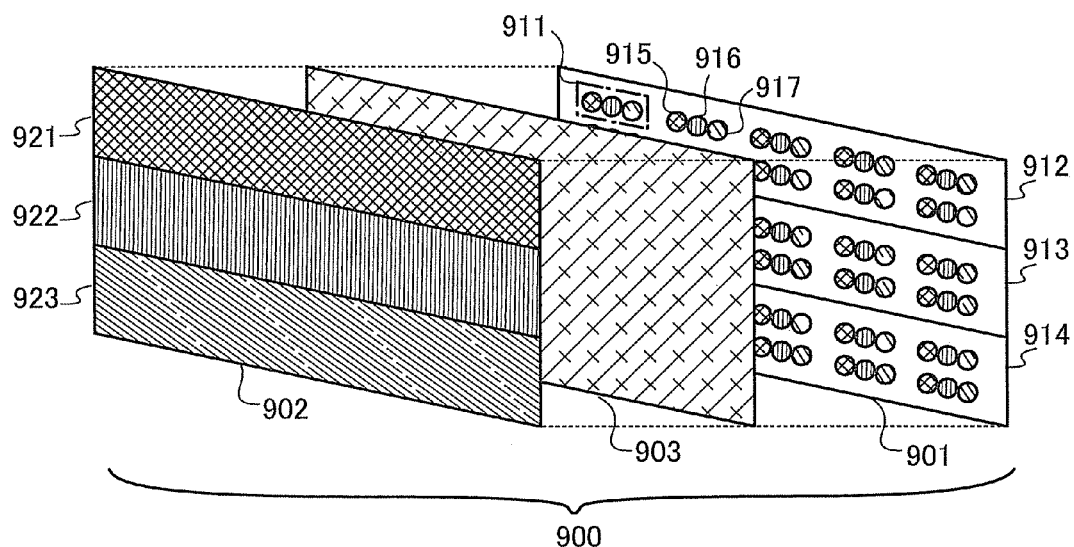
FIGS. 9A to 9C illustrate problems in one embodiment of the present invention.
Figure 9B:
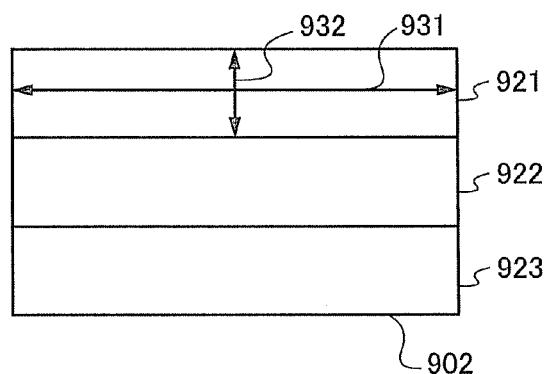
Figure 9C:
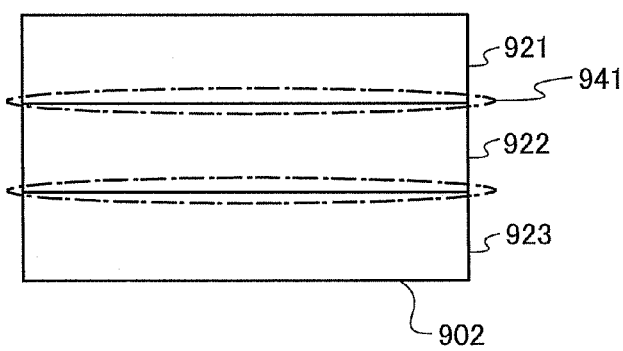

FIG. 8D illustrates an example of a cellular phone handset including a display device that includes a backlight unit disclosed in this specification. The cellular phone handset illustrated in FIG. 8D includes a display region 1732 incorporated in a housing 1731, operation buttons 1733 and 1737, an external connection port 1734, a speaker 1735, a microphone 1736, and the like.

The display region 1732 of the cellular phone handset illustrated in FIG. 8D is a touch panel. When the display region 1732 is touched with a finger or the like, contents displayed on the display region 1732 can be controlled. Further, operations such as making calls and composing mails can be performed by touching the display region 1732 with a finger or the like.

This embodiment can be combined with any of the structures described in the other embodiments as appropriate.

EXAMPLE

A backlight unit with the structure described in the above embodiment was actually manufactured and lit.

Figure 10:
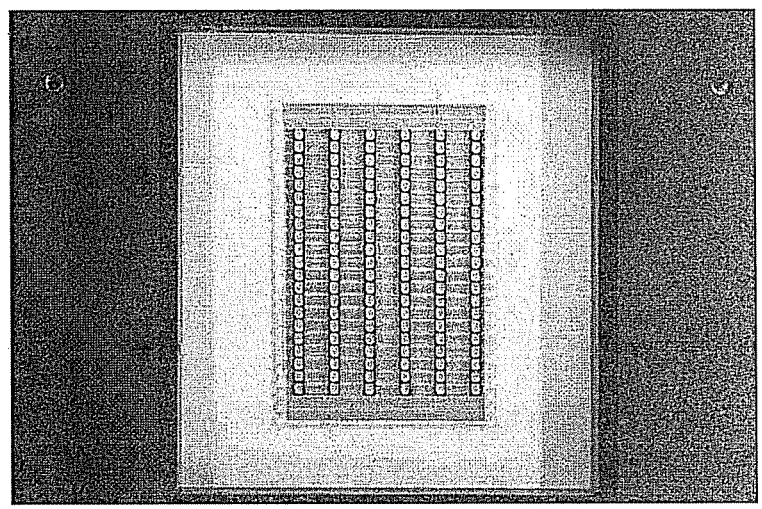
FIG. 10 illustrates an example.

FIG. 10 is a picture of the appearance of a backlight unit that was actually manufactured. As is clear from FIG. 10, light sources were provided in line in a light source portion of a backlight unit so that light was emitted zonally. LEDs that can emit lights of colors of R, G, and B sequentially were used as the light sources. In addition, in FIG. 10, a lenticular lens that serves as an optical system for narrowing the distribution of intensity of light overlapped with the light source portion.

Figure 11A:
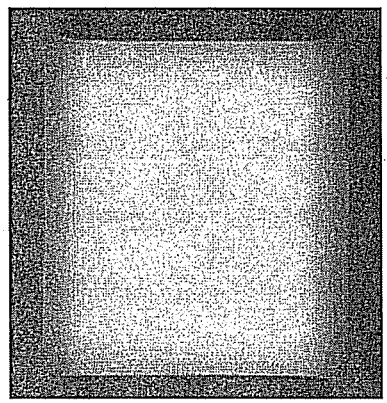
FIGS. 11A to 11C illustrate the example.
Figure 11B:
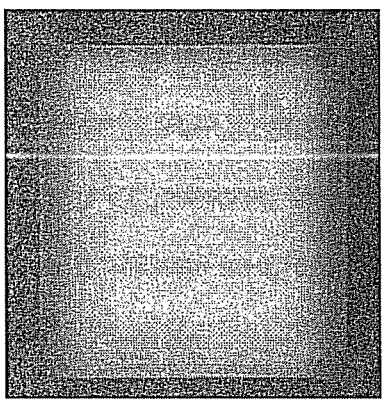

FIG. 11A is a picture at the time when the backlight unit in FIG. 10 was lit. Note that in FIG. 11A, light of green was emitted from the light source. As a comparative example, FIG. 11B is a picture at the time when a light source in a backlight unit that does not include an optical system was lit.

The luminance of the backlight unit that includes an optical system in FIG. 11A was measured to be 6024 cd/m². In contrast, the luminance of the backlight unit that does not include an optical system in FIG. 11B was measured to be 4039 cd/m². With the structure of the backlight unit that includes an optical system in the above embodiment, advantages such as uniform luminance and higher luminance were able to be obtained.

Figure 11C:
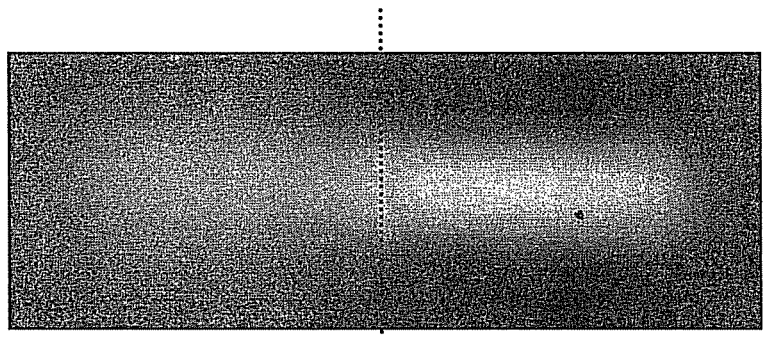

FIG. 11C is a magnified picture of light sources at the time when the light sources in only one line were lit. The left side of FIG. 11C illustrates a light source at the time when a lenticular lens that is an optical system was not provided. The right side of FIG. 11C illustrates a light source at the time when a lenticular lens that is an optical system was provided. The luminance on the left side of FIG. 11C was measured to be 1000 cd/m², and the luminance on the right side of FIG. 11C was measured to be 1521 cd/m².

From FIG. 11C, with the structure of the backlight unit that includes an optical system in the above embodiment, a contrast ratio around a light source was able to be improved and the luminance was able to be improved, which is advantageous. Note that according to the actual measurement, a contrast ratio at the time when a lenticular lens that is an optical system was not provided was 163:1, and a contrast ratio at the time when a lenticular lens that is an optical system was provided was 187:1.

In addition, with the structure of the backlight unit that includes an optical system in the above embodiment, a contrast ratio around a light source was able to be improved and an NTSC ratio was able to be improved, which is advantageous. Note that according to the actual measurement, an NTSC ratio at the time when a lenticular lens that is an optical system was not provided was 76.36%, and an NTSC ratio at the time when a lenticular lens that is an optical system was provided was 90.09%.

This application is based on Japanese Patent Application serial No. 2010-236187 filed with Japan Patent Office on Oct. 21, 2010, the entire contents of which are hereby incorporated by reference.

What is claimed is:

1. A backlight unit comprising:
    a light source portion comprising a plurality of zonal light source regions; and
    an optical system adjacent to the light source portion,
    wherein each of the plurality of zonal light source regions comprises a plurality of light sources of a plurality of colors,
    wherein the plurality of light sources are arranged in matrix,
    wherein one of the plurality of zonal light source regions is configured to emit a first light in a period, and a region adjacent to the one of the plurality of zonal light source regions is configured to emit a second light in the period,
    wherein a color of the first light is different from a color of the second light, and
    wherein the optical system is configured to narrow a distribution of intensity of a light emitted from each of the plurality of zonal light source regions in a minor-axis direction in any one of the plurality of zonal light source regions.

2. The backlight unit according to claim 1,
    wherein the optical system is configured to uniform the distribution of intensity of the light emitted from each of the plurality of zonal light source regions in a major-axis direction.

3. The backlight unit according to claim 1,
    wherein the optical system is a lenticular lens.

4. The backlight unit according to claim 1, further comprising:
    a diffuser sheet over the light source portion with the optical system interposed therebetween,
    wherein the diffuser sheet is configured to diffuse a light whose intensity is corrected by the optical system.

5. The backlight unit according to claim 1,
    wherein the plurality of colors are for a color display.

6. The backlight unit according to claim 1,
    wherein the plurality of colors comprise red, green, and blue.

7. The backlight unit according to claim 6,
    wherein the plurality of colors further comprise at least one of cyan, magenta, and yellow.

8. The backlight unit according to claim 1,
    wherein each of the plurality of light sources is a light-emitting diode.

9. A display device comprising:
    an element substrate;
    a backlight unit overlapping with the element substrate, the backlight unit comprising:
        a light source portion comprising a plurality of zonal light source regions; and
        an optical system between the element substrate and the light source portion,
    wherein each of the plurality of zonal light source regions comprises a plurality of light sources of a plurality of colors,
    wherein the plurality of light sources are arranged in matrix,
    wherein one of the plurality of zonal light source regions is configured to emit a first light in a period, and a region adjacent to the one of the plurality of zonal light source regions is configured to emit a second light in the period,
    wherein a color of the first light is different from a color of the second light, and
    wherein the optical system is configured to narrow a distribution of intensity of a light emitted from each of the plurality of zonal light source regions in a minor-axis direction in any one of the plurality of zonal light source regions.

10. The display device according to claim 9,
    wherein the optical system is configured to uniform the distribution of intensity of the light emitted from each of the plurality of zonal light source regions in a major-axis direction.

11. The display device according to claim 9,
    wherein the element substrate comprises a plurality of zonal display regions,
    wherein the plurality of zonal display regions overlap the plurality of zonal light source regions, and
    wherein a color of one of the plurality of zonal display regions is same as a color of one of the plurality of zonal light source regions.

12. An electronic device comprising the display device according to claim 9.

13. The display device according to claim 9,
    wherein the optical system is a lenticular lens.

14. The display device according to claim 9, further comprising:
    a diffuser sheet over the light source portion with the optical system interposed therebetween,
    wherein the diffuser sheet is configured to diffuse a light whose intensity is corrected by the optical system.

15. The display device according to claim 9,
    wherein the plurality of colors comprise red, green, and blue.

16. A backlight unit comprising:
a light source portion comprising a plurality of light source regions; and
an optical system adjacent to the light source portion, the optical system comprising a lens,
wherein each of the plurality of light source regions comprises a plurality of light sources of a plurality of colors,
wherein the plurality of light sources are arranged in matrix,
wherein the lens is configured to narrow a distribution of intensity of a light emitted from each of the plurality of light source regions in a longitudinal direction of each of the plurality of light source regions,
wherein the plurality of light source regions include a first light source region, a second light source region, a third light source region between the first light source region and the second light source region, and
wherein the first light source region, the second light source region, the third light source region are configured to emit lights of different colors in the plurality of colors from each other in the same period.

17. The backlight unit according to claim 16,
wherein the lens is configured to uniform the distribution of intensity of the light emitted from each of the plurality of light source regions in a lateral direction.

18. The backlight unit according to claim 16,
wherein a lateral direction of lens corresponds to the longitudinal direction of each of the plurality of light source regions.

19. The backlight unit according to claim 16,
wherein the lens is a lenticular lens.

20. The backlight unit according to claim 16, further comprising:
a diffuser sheet over the light source portion with the optical system interposed therebetween,
wherein the diffuser sheet is configured to diffuse a light whose intensity is corrected by the lens.

21. A display device comprising:
an element substrate comprising a display region; and
the backlight unit according to claim 16.

22. An electronic device comprising the display device according to claim 21.

* * * * *